Dec. 6, 1927.  
W. N. DUNN, SR  
SNUBBER FOR AUTOMOBILES  
Filed April 8, 1927  
1,651,679  
2 Sheets-Sheet 1
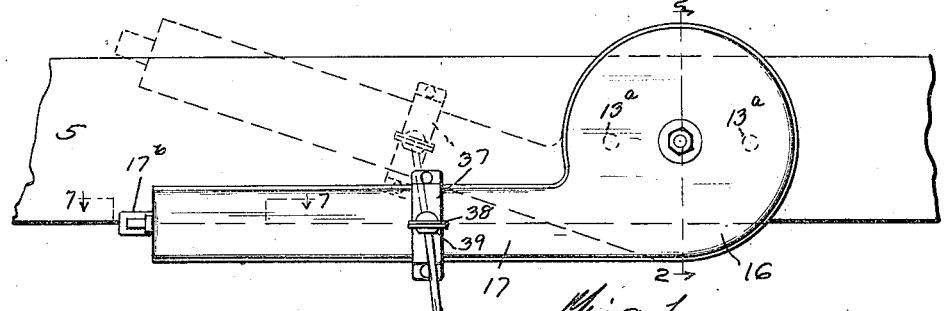
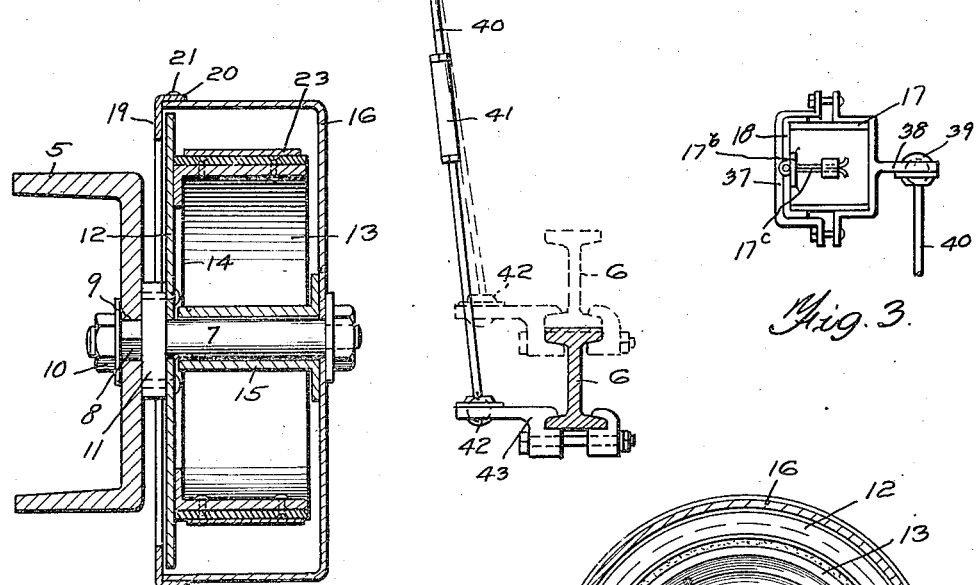
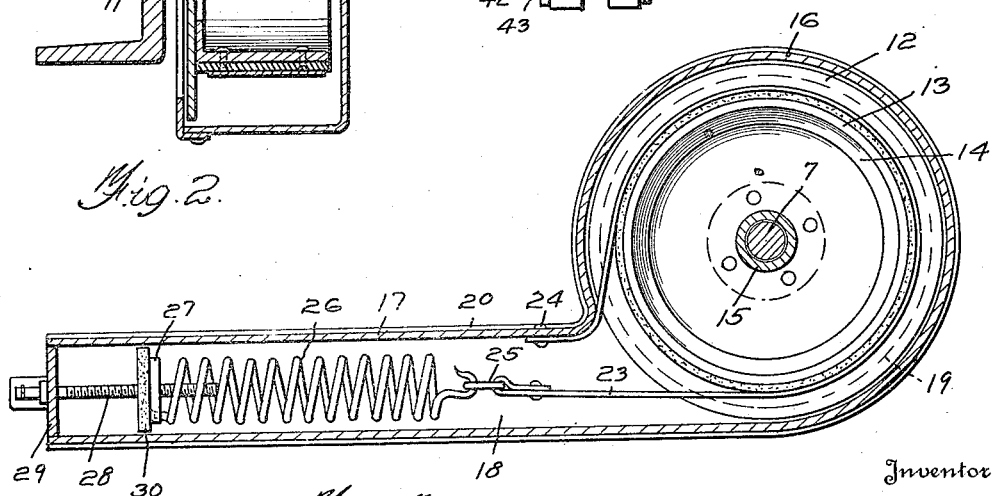
Inventor  
William N. Dunn Sr.  
By Shephard Campbell  
Attorney Dec. 6, 1927.                                                       1,651,679
W. N. DUNN, SR
SNUBBER FOR AUTOMOBILES
Filed April 8, 1927                            2 Sheets-Sheet 2
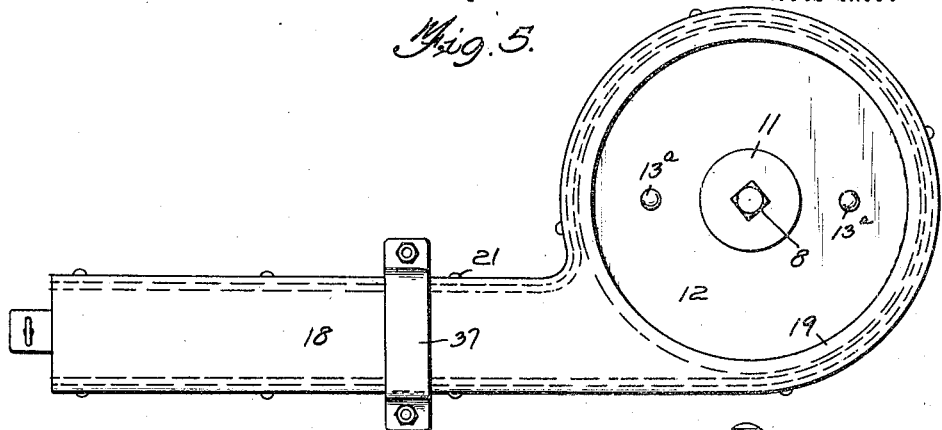
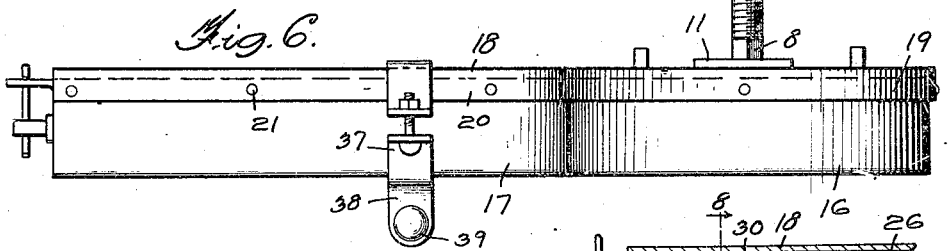
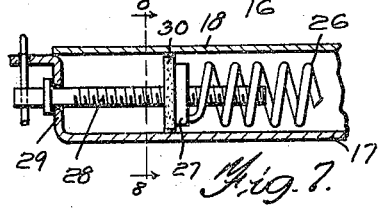
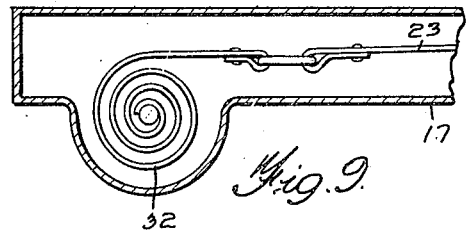
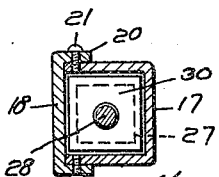
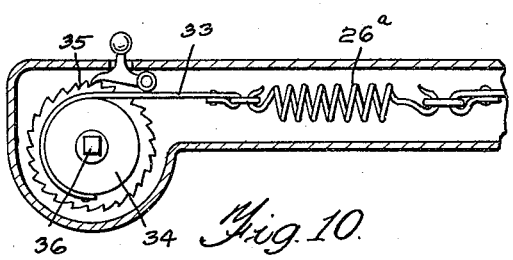
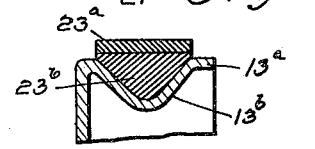
Inventor
William N. Dunn Sr
By Shepherd Campbell
Attorney Patented Dec. 6, 1927.

1,651,679

UNITED STATES PATENT OFFICE.

WILLIAM NELSON DUNN, SR., OF MARTINSBURG, WEST VIRGINIA.

SNUBBER FOR AUTOMOBILES.

Application filed April 8, 1927. Serial No. 182,136.

This invention relates to snubbers or shock absorbers for motor vehicles and it has for its object to provide an improved device of this character constructed in such manner as to effectively check excessive rebound of the body of the vehicle, and to aid in preventing the transmission of minor vibrations of the axles to the body of the vehicle.

Further objects and advantages of the invention will be set forth in the detailed description which follows.

In the accompanying drawings:

Fig. 1 is a side elevation illustrating the application of a snubber constructed in accordance with the present invention.

Fig. 2 is a transverse vertical sectional view on line 2—2 of Fig. 1.

Fig. 3 is an end elevation of the tubular extension hereinafter described.

Fig. 4 is a longitudinal vertical section through the main casing of the snubber.

Fig. 5 is a rear elevation of the snubber.

Fig. 6 is a plan view thereof.

Fig. 7 is a sectional view upon line 7—7 of Fig. 1.

Fig. 8 is a transverse sectional view upon line 8—8 of Fig. 7.

Fig. 9 is a sectional view of a modified form of tensioning means hereinafter described.

Fig. 10 is a longitudinal sectional view of a further modified form of tensioning means, and Fig. 11 is a sectional view of a modified form of friction drum and friction band, hereinafter described.

Like numerals designate corresponding parts in all of the figures of the drawings.

In the drawings, 5 designates one of the side members of the chassis of an automobile and 6 of the axles thereof, such, for example, as the front axle, a stub shaft 7 has an angular part 8 disposed in a correspondingly shaped opening 9 of the chassis 5. The stub shaft 7 may be held in place by any suitable means, such, for example, as by a nut 10 threaded thereon. The shaft carries a collar 11 and this collar, in turn, has a disc 12 riveted, welded or otherwise secured thereto. A fixed friction drum 13 is provided with a flange 14 that is welded or otherwise secured to the disk 12. A hub 15 that is mounted to oscillate or turn upon the shaft 7 carries a housing, consisting of a substantially circular body 16 and an arm or extension 17. The rear wall of this housing is constituted by a plate 18 and an annular member 19, which conform in general outline to the extension 17 and casing 16, and is provided with a flange extending around the outer edge thereof, which takes over the confronting edge of the casing 16 and extension 17, as indicated at 20 in Fig. 2, said flange being secured to said casing and extension by rivets 21 or by welding or otherwise. A friction band 23 is secured at 24 to the extension 17 and is passed part way around the friction drum 13. The end of this band is connected by a link or by any other suitable element 25 with one end of a tension spring 26. The other end of the spring 26 is secured to a nut 27 which engages a tension adjusting screw 28, that is mounted for turning movement in the end wall 29 of the housing 17. A square leather washer 30 is secured to the nut 26 and its angular shape prevents said nut from turning and suitably guides the nut and washer in the angular bore of the extension 17. Thus it is manifest that if turning movement be imparted to screw 28, endwise movement will be imparted to nut 27 to change the tension of the spring 26. The band 23 may be made of flexible metal, such as brass, for example, and I may cover the drum with a suitable friction material, such as leather, canvas, or woven fabric, such as brake lining. This arrangement not only increases friction but prevents screeching or squeaking during the movement of the band over the drum.

In Fig. 9, I have illustrated a modified form of tensioning means for the friction band 23, comprising a spiral spring 32 in the nature of a clock spring.

In Fig. 10, a spring 26ª, corresponding to the spring 26, is connected at its outer end to a band 33 which may be wound upon a drum 34, reverse movement of which is resisted by a ball and ratchet mechanism 35. By imparting turning movement to the drum, through the medium of a key or other tool applied to an angular end 36 of the shaft thereof, any desired adjustment may be effected, with respect to the tension of spring 26ª.

Fig. 11 is intended to illustrate that the friction between the band and drum may be increased by providing the drum 13ᵃ with a V-shaped periphery 13ᵇ and by providing the band 23ᵃ with a V-shaped working face 23ᵇ to co-act with said drum.

The extension 17 of the housing is embraced by a suitable bracket or clamp 37, said bracket carrying an extension 38 which has a ball and socket connection 39 with the upper end of a rod 40. This rod is rendered adjustable as to length by the provision of a turn buckle 41 and its lower end has a ball and socket connection 42 with a bracket 43, that is engaged with the axle 6.

Thus it will be seen that the connection between the axle and the housing 17 is a longitudinally rigid connection, so that the housing 17 will partake of upward movement of the axle 6, as well as downward movement thereof. This is in contradistinction to certain constructions heretofore employed, wherein the connection between the axle and the housing was a flexible connection.

While the band 23 resists movement of the chassis 5, with respect to the axle 6, at all times and in all positions, the retarding action is much more pronounced when it is tending to prevent rebound of the chassis 5 with respect to the axle. That is, when the axle and chassis move toward each other the direction of turning of the housing 16 is such as to merely impart tension to spring 26 and the result is to little more than cause said spring to take up the slack in the band, but when the axle and chassis move apart under the rebound of the main springs the pull upon the friction band is from the unyielding point of attachment 24.

Thus the snubber does not appreciably diminish the effectiveness of the usual main springs of the vehicle, but it acts very promptly to check excessive rebound. In addition the rigid connection provided by the rod 40 brings even the minor movements of the axle and chassis, under control of the snubber and aids in decreasing excessive vibration on roads having minor inequalities. Further adjustment of the action of the snubber may be had by adjustment of bracket 37 on extension 17, it being apparent that if the bracket be moved toward the drum 13 the movement of the band with respect to the drum will be increased.

The end wall 17ᵃ of the extension 17 is provided with an outstanding lip 17ᵇ which serves to receive a locking pin 17ᶜ, said pin passing through the outer end of the screw 28 and holding it against accidental turning movement. The rear face of the disc 13 may, if desired, be provided with pins 13ᵃ to take into openings, not shown, in the frame member 5 of the chassis to aid in preventing turning movement of said disc. The leather washer 30 not only prevents its associated nut from turning but it prevents rattling of said nut against the wall of the extension 17.

It is to be understood that the invention is not limited to the precise construction set forth but that it includes within its purview whatever changes fairly come within either the terms or the spirit of the appended claims.

Having described my invention what I claim is:

1. A device of the character described comprising a fixed drum and means for attaching the same to the chassis of an automobile, a housing mounted to turn with respect to said drum, comprising an elongated extension, a tensioning means disposed in said extension, a friction band passed about said drum having one end attached to said tensioning means and the other end attached to said housing and a rigid connection for connecting said extension to a vehicle axle.

2. A device of the character described comprising a stub shaft and means for fixing the same to the chassis of an automobile, a fixed drum secured to said shaft, a sleeve mounted to turn upon said shaft, a housing connected to said sleeve comprising an elongated extension, a friction band passed around said drum and having one end secured to said housing, a tension spring in the elongated extension to which the other end of said band is attached, a nut to which the outer end of the tension spring is connected, an adjusting screw carried by the elongated extension of the housing and engaging said nut, the head of said screw being accessible from outside of said housing and a non-metallic washer secured to said nut and of such configuration as to prevent the nut from turning in said extension.

3. A device of the character described comprising a fixed stub shaft, means for securing the same to the chassis of an automobile, a circular disk supported from said stub shaft, a fixed friction drum supported from said disk, a sleeve mounted to turn upon said shaft, a housing fixed to said sleeve and moving therewith and comprising a circular casing and an elongated extension, and a closure plate for the rear side of said elongated extension carrying a flanged ring that is connected to the circular casing and overlaps the disk.

4. A structure as recited in claim 3 in combination with a friction band within the circular part of the casing engaging the friction disk and having one end secured to the said casing at the juncture of the circular casing and the elongated extension, a tension spring to which the other end of said band is connected and which lies longitudinally in said elongated extension, an adjusting screw journaled in the end of said elongated extension and having an operating head disposed upon the exterior thereof, a nut to which the outer end of said spring is connected and with which said screw is engaged.

5. A structure as recited in claim 3 in combination with a rigid connection extending between said elongated extension and an axle of the vehicle and having flexible connection with said extension and axle.

In testimony whereof I affix my signature.

WILLIAM NELSON DUNN, Sr.